United States Patent
DeVries et al.

(10) Patent No.: US 6,932,311 B2
(45) Date of Patent: Aug. 23, 2005

(54) COMPACT CONTAINER HOLDER

(75) Inventors: Charles R. DeVries, Lowell, MI (US); Lance A. King, Wyoming, MI (US); Larry D. Hirdning, Rockford, MI (US); Larry P. Gaspar, Rockford, MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 10/412,793

(22) Filed: Apr. 11, 2003

(65) Prior Publication Data

US 2004/0200942 A1 Oct. 14, 2004

(51) Int. Cl.⁷ .............................................. A47K 1/08
(52) U.S. Cl. .................................. 248/311.2; 224/926
(58) Field of Search ........................ 248/311.2, 312.1, 248/314, 309.1; 224/482, 926, 282, 549; 297/188.19, 188.01, 188.14

(56) References Cited

U.S. PATENT DOCUMENTS

| | | | |
|---|---|---|---|
| 2,649,270 A | 8/1953 | Franks ........................ 248/311 |
| 4,828,211 A | 5/1989 | McConnell et al. ..... 248/311.2 |
| 4,984,722 A | 1/1991 | Moore ......................... 224/549 |
| 5,072,909 A | 12/1991 | Huang ..................... 248/311.2 |
| 5,190,259 A | 3/1993 | Okazaki ................... 248/311.2 |
| 5,318,266 A | 6/1994 | Liu .......................... 248/311.2 |
| 5,342,009 A | 8/1994 | Lehner ..................... 248/311.2 |
| 5,423,508 A | 6/1995 | Isenga et al. ............. 248/311.2 |
| 5,527,008 A | 6/1996 | Schutter et al. .......... 248/311.2 |
| 5,603,477 A | 2/1997 | Deutsch ................... 248/311.2 |
| 5,671,877 A | 9/1997 | Yabuya .................... 248/311.2 |
| 5,791,618 A | 8/1998 | Lancaster .................... 224/282 |
| 5,800,011 A | 9/1998 | Spykerman ............. 248/311.2 |
| 5,820,094 A | 10/1998 | Tanaka ..................... 248/311.2 |
| 5,876,007 A | 3/1999 | Lancaster et al. ........ 248/311.2 |
| 5,897,089 A | 4/1999 | Lancaster et al. ........ 248/311.2 |
| 6,047,937 A * | 4/2000 | Huang ..................... 248/311.2 |
| 6,076,793 A | 6/2000 | Yamamoto ............... 248/311.2 |
| 6,095,471 A | 8/2000 | Huang ..................... 248/311.2 |
| 6,427,960 B1 * | 8/2002 | Gehring et al. .......... 248/311.2 |

FOREIGN PATENT DOCUMENTS

| | | | |
|---|---|---|---|
| DE | 43 44 372 A1 | 6/1995 | |
| DE | 196 30 056 A1 | 1/1997 | |
| DE | 202 12 850 U 1 | 11/2002 | |
| GB | 2303781 A | 3/1997 | |
| JP | 6-92174 * | 4/1994 | ............. 248/311.2 |
| JP | 06092174 | 4/1994 | |
| JP | 2000062510 | 2/2000 | |

OTHER PUBLICATIONS

International Search Report from related international application number PCT/US2004/009867, dated Sep. 13, 2004.

* cited by examiner

Primary Examiner—Ramon O Ramirez
(74) Attorney, Agent, or Firm—McDonnell Boehnen Hulbert & Berghoff LLP

(57) ABSTRACT

A compact container holder that comprises a housing, a door, and at least one arm is provided. The arm can be linked to the door through a linkage that can also connect opposing dual pivots. The opposing dual pivots can allow the container holder to fully open and close in one controllable motion, providing a container holder that simply and reliably opens and closes.

18 Claims, 3 Drawing Sheets

COMPACT CONTAINER HOLDER

BACKGROUND

1. Field of the Invention

The present invention relates to a compact container holder, and more specifically to a container holder that functions simply and reliably.

2. Description of the Related Art

When used in a vehicle, container holders (such as cup holders) can make a vehicle safer by securely holding a container in a convenient location. A compact and easily accessible container holder might allow a driver or other vehicle occupant to concentrate on tasks other than holding a container, such as driving the vehicle. Further, a simple and reliable container holder might save a vehicle owner or manufacturer the expense and time of costly repairs.

Thus, there is a need for a compact container holder that functions simply and reliably when opened and closed.

SUMMARY

As stated, the present invention is drawn to a compact container holder that can be simply and reliably opened and closed. Accordingly, an exemplary embodiment comprises a housing, a door pivotally connected to the housing at a door pivot, an arm pivotally connected to the housing at an arm pivot, and a linkage having a first end pivotally connected to the door at a linkage-door pivot and a second end pivotally connected to the arm at a linkage-arm pivot. In this embodiment, the linkage-door pivot rotates about the door pivot and the linkage-arm pivot rotates about the arm pivot, such that the door and the arm rotate open in opposite directions. The present embodiment allows for a compact container holder that simply and reliably opens and closes in one controllable motion.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
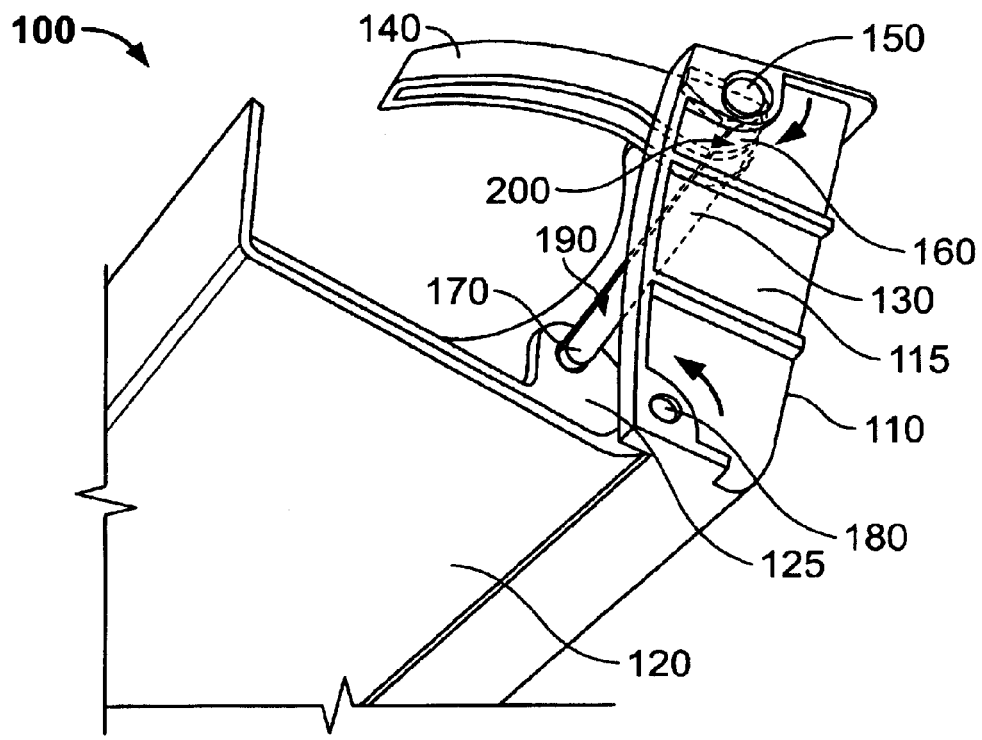
FIG. 1 is an isometric view of the compact container holder rotating to the open position.
Figure 2:
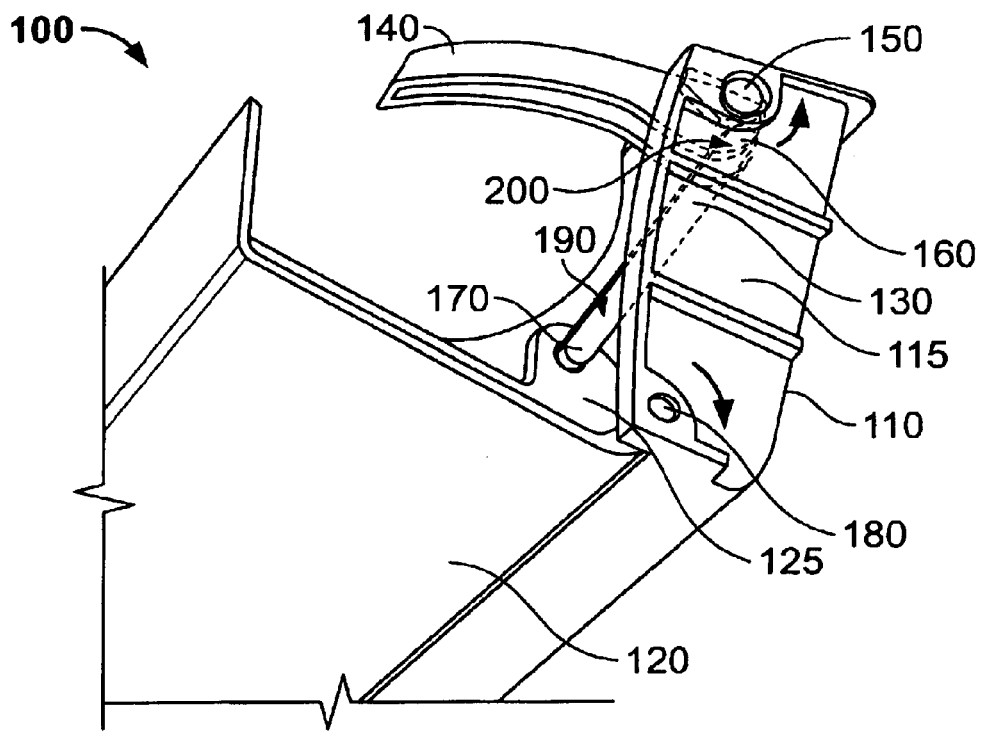
FIG. 2 is an isometric view of the compact container holder rotating to the closed position.

As shown in FIGS. 1 and 2, container holder 100 comprises a housing 110. The housing 110 might include at least one housing side 115. The housing 110 might also be constructed such that it could fit into a component in the interior of a vehicle, such as a dashboard, center console, or the interior of a door, for example.

Figure 3:
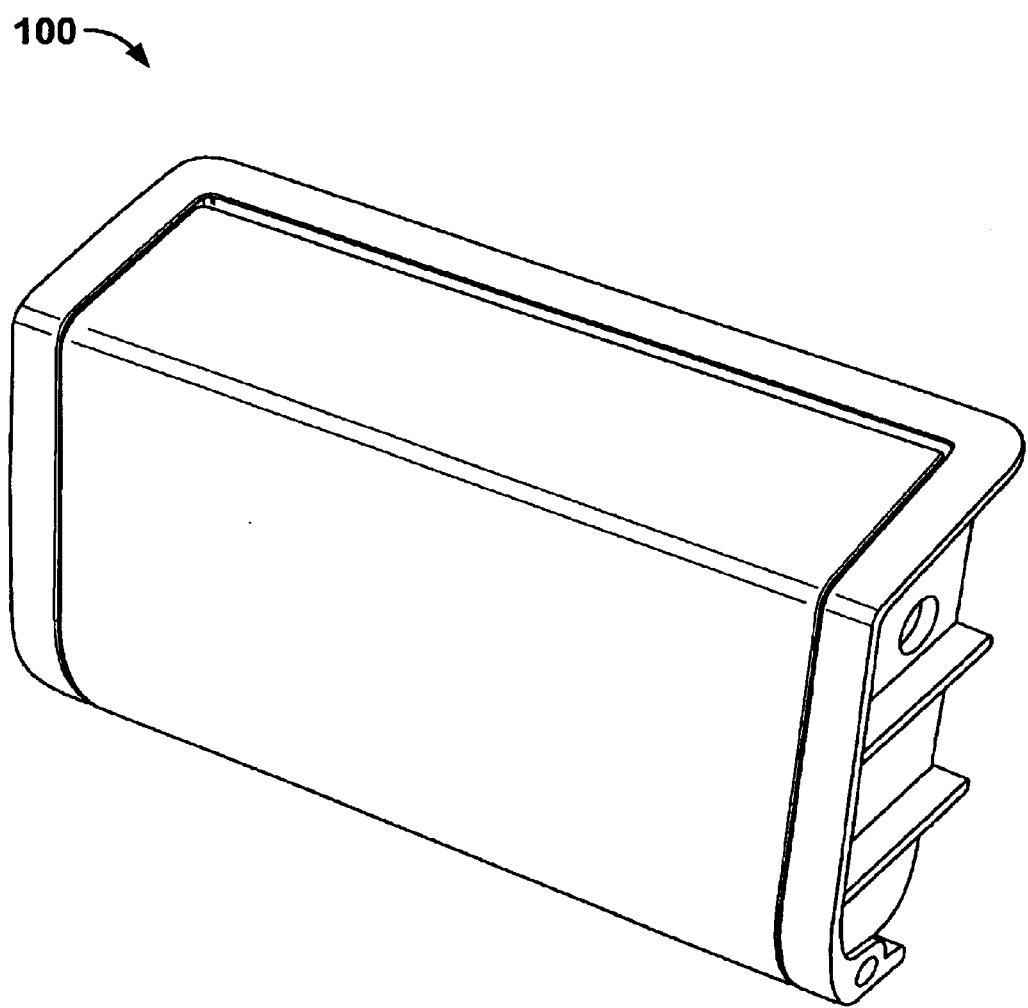
FIG. 3 is an isometric view of the compact container holder in the closed position.

As shown in FIGS. 1 and 2, a door 120 can be connected to the housing 110 at a door pivot 180. The door 120 also can include at least one door side 125. The door 120 might serve several functions. The door 120 can be rotated to the open position, as depicted in FIG. 1, to simply and reliably open the container holder 100. Likewise, the door 120 can be rotated to the closed position, as depicted in FIG. 2, to simply and reliably close the container holder 100. In the closed position, as depicted in FIG. 3, door 120 might protect the container holder 100, especially the arm or arms 140 and the linkage or linkages 130, from damage. In addition, in the closed position, door 120 might provide a preferably solid and continuous exposed surface that can be designed to complement a vehicle's interior. In the open position, as depicted in FIG. 1, door 120 might also help support a container.

Referring again to FIGS. 1 and 2, arm 140 is connected to the housing 110 at arm pivot 150. An exemplary embodiment might include a first and second arm 140 each pivotally mounted at spaced-apart positions to the housing. It is possible, however, that a container holder has only one arm 140 or any number of arms 140. Further, it is also possible that more than one arm 140 may be connected to one arm pivot 150 depending, for example, on what loads are required, and the strength of the materials used. Arm 140 may be shaped or biased (by a spring, for example) to facilitate the support of containers or opening or closing of the container holder 100.

A linkage 130 with a first end 190 and a second end 200 can connect the door 120 to the arm 140. Although linkage 130 is depicted as a single, rigid member in this embodiment, linkage 130 can, for example, take different shapes. Preferably there would be a first and second linkage 130. It is possible, however, that a container holder has only one linkage 130 or any number of linkages 130.

The first end 190 of linkage 130 can be connected to the door 120 at linkage-door pivot 170. As shown in FIG. 1, as door 120 is moved into the open position, linkage-door pivot 170 can rotate about door pivot 180, in a first rotational direction, as shown by the large arrow adjacent door pivot 180. Also as shown in FIG. 1, the second end 200 of linkage 130 can be connected to arm 140 at linkage-arm pivot 160; wherein the second end does not slide relative to the arm. The rotation of the linkage-door pivot 170 about door pivot 180 can cause the linkage-arm pivot 160 to rotate about arm pivot 150 in a rotational direction that is opposed to the rotational direction of linkage-door pivot 170 about door pivot 180, as shown by the large arrow adjacent arm pivot 150.

The rotation of the linkage-arm pivot 160 about arm pivot 150 in response to and in a direction opposite from the rotation of linkage-door pivot 170 about door pivot 180 can allow the arm or arms 140 to rotate in a direction opposite to the direction of the rotation of door 120. The rotation of the linkage-arm pivot 160 and arm 140 in response to the rotation of the door 120 can allow for the container holder to be opened or closed in one controllable motion. Further, the opposite rotational directions of the arm 140 and door 120 can allow the arm 140 to fold within door 120 in the closed position, allowing for a more compact design.

In an exemplary embodiment, arm 140 and door 120 can rotate in opposite directions because the position of linkage-arm pivot 160 relative to arm pivot 150 opposes the position of linkage-door pivot 170 relative to door pivot 180. Linkage 130 connects these opposing dual pivots such that when the door 120 rotates and causes the linkage-door pivot 170 to rotate about door pivot 180 in a first rotational direction, linkage 130 can responsively cause linkage-arm pivot 160 to rotate about arm pivot 150 in a second, opposite rotational direction.

To illustrate further, as depicted in FIG. 1, as door 120 rotates toward an open position, door 120 can rotate in a first rotational direction about door pivot 180. Likewise, linkage-door pivot 170 can also rotate toward the open position in the first rotational direction about door pivot 180. Linkage-arm pivot 160 (linked to door 120 through linkage 130), however, can rotate toward the open position in a second, opposite rotational direction about arm pivot 150. Likewise, arm 140 can also rotate toward the open position in the second rotational direction about arm pivot 150.

Analogously, as depicted in FIG. 2, as door 120 rotates toward a closed position, door 120 can rotate in the second rotational direction about door pivot 180. Likewise, linkage-door pivot 170 can also rotate toward the closed position in the second rotational direction about door pivot 180. Linkage-arm pivot 160 (linked to door 120 through linkage 130), however, can rotate toward the closed position in the first, opposite rotational direction about arm pivot 150. Likewise, arm 140 can also rotate toward the closed position in the first rotational direction about arm pivot 150.

FIGS. 1 and 2 depict linkage 130 connected to the door side 125. Linkage 130, however, may be connected to the door 120 anywhere on the door 120 provided that the axis of linkage-door pivot 170 rotates about the axis of door pivot 180. In addition, FIGS. 1 and 2 depict door pivot 180 connected to the housing side 115. Door pivot 180, however, may be connected anywhere on the housing 110, provided that the axis of linkage-door pivot 170 rotates about the axis of door pivot 180. Likewise, arm pivot 150 may be connected to the housing 110, and the linkage-arm pivot 160 may be connected to the arm (or arms) 140, anywhere on the housing 110 and arm (or arms) 140 respectively, provided that the axis of linkage-arm pivot 160 can rotate about the axis of arm pivot 150. It is not necessary that the pivots rotate about each other in the same plane, only that the axes of the pivots can rotate about each other. In addition, the term pivot as used in the specification and claims is to be construed broadly to encompass pivots, hinges, and other joints and flexible devices that allow a structural member to rotate or turn.

Where two or more linkages 130 are used, they might be pivotally mounted to the door 120 and the housing 110 through the arms 140 such that the linkages 130 can work in tandem. They may be mounted adjacent to each other, or in spaced-apart positions, using spaced-apart arm pivots, door pivots, linkage-arm pivots, and linkage-door pivots. For example, two linkages 130 may be pivotally mounted to arms 140 on generally opposed housing sides 115 and to generally opposed door sides 125 to support the door 120.

Figure 4:
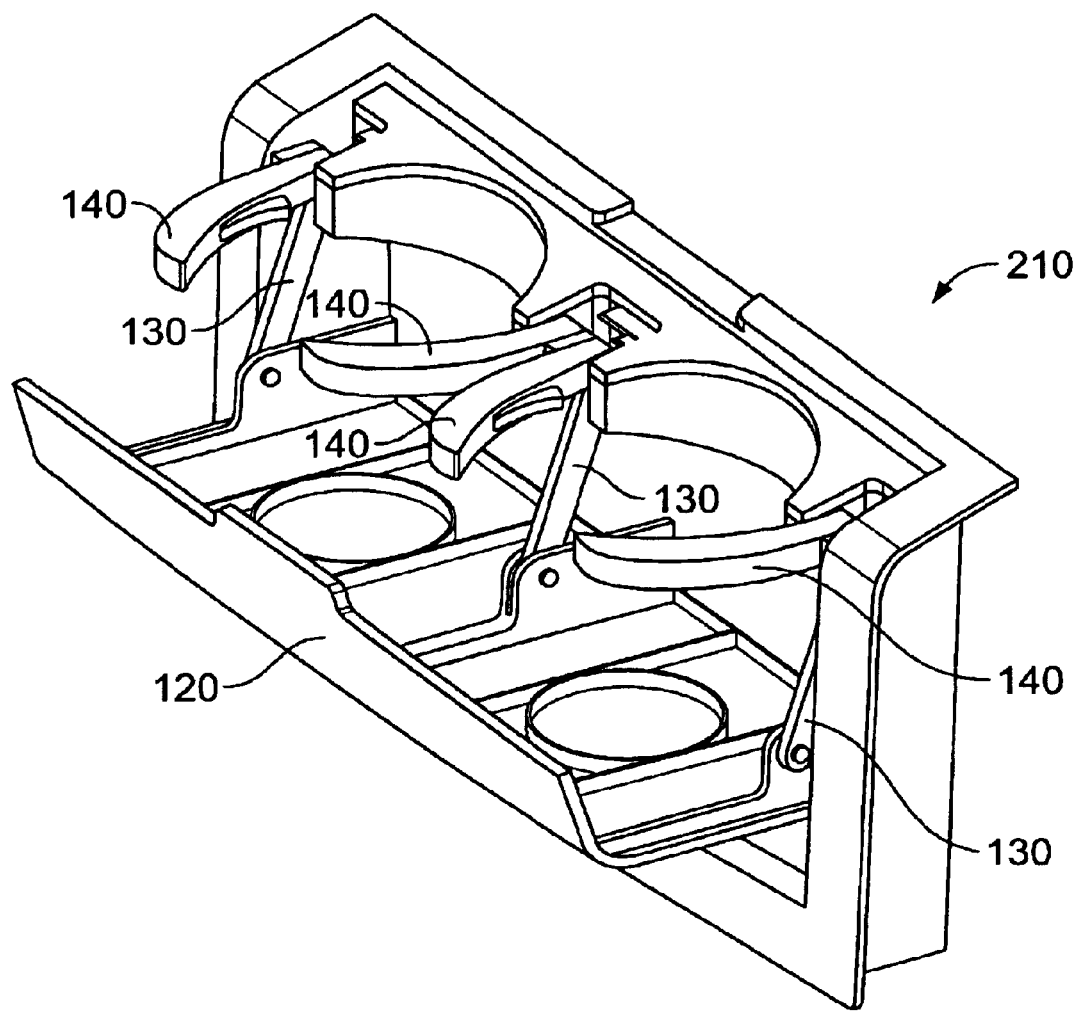
FIG. 4 is an isometric view of a dual compact container holder.

Other embodiments of the container holder 100 are possible. For instance, FIG. 4 shows a dual compact container holder 210 that might hold two containers. In an exemplary embodiment, the dual compact container holder 210 might have four arms 140 and three linkages 130. Other configurations of the arms 140 and linkages 130 are possible (such as, for example, a dual compact container holder 210 with three arms 140 or four linkages 130). Similar to the compact container holder 100 of FIGS. 1 and 2, the dual compact container holder 210 can open and close in one controllable motion. Further, similar to the compact container holder 100 of FIGS. 1 and 2, the arms 140 and the door 120 of the dual compact container holder 210 can rotate in opposite rotational directions such that the arms 140 can fold within the door 120 in the closed position, allowing for a more compact design.

Several exemplary embodiments of the present invention have been described above. Those skilled in the art will understand, however, that changes and modifications may be made to these embodiments without departing from the true scope and spirit of the present invention, which is defined by the claims.

We claim:
1. A container holder comprising:
   a housing;
   a door pivotally connected to the housing;
   at least one arm, each at least one arm pivotally connected directly to the housing; and
   at least one linkage having a first end pivotally connected to the door and a second end pivotally connected to said arm, wherein the second end does not slide relative to said arm.
2. The container holder of claim 1, wherein:
   the door is pivotally connected to the housing at a door pivot;
   said arm is pivotally connected to the housing at an arm pivot;
   the first end of said linkage is pivotally connected to the door at a linkage-door pivot and the second end of said linkage is pivotally connected to said arm at a linkage-arm pivot; and
   wherein the linkage-door pivot rotates about the door pivot and the linkage-arm pivot rotates about the arm pivot.
3. The container holder of claim 2, wherein the linkage-door pivot rotates about the door pivot in a direction opposite to the direction the linkage-arm pivot rotates about the arm pivot.
4. The container holder of claim 1, wherein:
   the housing has at least one housing side; and
   said arm is pivotally connected to said housing side.
5. The container holder of claim 4, wherein:
   the door has at least one door side; and
   wherein said door side is pivotally connected to said housing side at the door pivot.
6. The container holder of claim 1, wherein said "at least one arm" comprises two arms each pivotally connected at spaced-apart positions to the housing; and said "at least one linkage" comprises two linkages each having a first end pivotally connected at spaced-apart positions to the door and a second end pivotally connected to said arms.
7. The container holder of claim 6, wherein:
   the door is pivotally connected to the housing using two spaced-apart door pivots;
   the arms are pivotally connected to the housing at spaced-apart arm pivots;
   the first end of the linkages are each pivotally connected to the door at spaced-apart linkage-door pivots and the second end of the linkages are each pivotally connected to their respective arms at a linkage-arm pivot;
   wherein the linkage-door pivots on each linkage rotates about a door pivot and the linkage-arm pivot on each arm rotate about an arm pivot.
8. The container holder of claim 7, wherein the linkage-door pivot on each linkage rotates about a door pivot in a direction opposite to the direction the linkage-arm pivot on said linkage rotates about an arm pivot.
9. The container holder of claim 6, wherein:
   the housing has at least two generally opposed housing sides; and
   wherein one arm is pivotally connected to at least one of said generally opposed housing sides.
10. The container holder of claim 9, wherein:
    the door has at least two generally opposed door sides; and
    wherein the at least two generally opposed door sides are each pivotally connected to the at least two generally opposed housing sides at spaced-apart door pivots.

11. A container holder comprising:

a housing;

a door pivotally connected to the housing at at least one door pivot;

at least one arm pivotally connected to the housing at an arm pivot; and at least one linkage having a first end pivotally connected to the door at a linkage-door pivot and a second end pivotally connected to said arm at a linkage-arm pivot, the linkage-door pivot rotating about said door pivot and the linkage-arm pivot rotating about the arm pivot; and wherein the linkage-door pivot rotates about said door pivot in a direction opposite to the direction the linkage-arm pivot rotates about the arm pivot.

12. The container holder of claim 11, wherein:

the housing has at least one housing side; and wherein said arm is pivotally connected to said housing side at the arm pivot.

13. The container holder of claim 12, wherein:

the door has at least one door side; and wherein said door side is pivotally connected to said housing side at said door pivot.

14. The container holder of claim 11, wherein the container holder further comprises:

a door pivotally connected to the housing at two spaced-apart door pivots;

two arms pivotally connected to the housing at spaced-apart arm pivots; and two spaced-apart linkages each having a first end pivotally connected to the door at a linkage-door pivot and a second end pivotally connected to an arm at a linkage-arm pivot, the linkage-door pivot rotating about the door pivot and the linkage-arm pivot rotating about the arm pivot; and wherein the linkage-door pivot rotates about the door pivot in a direction opposite to the direction the linkage-arm pivot rotates about the arm pivot.

15. The container holder of claim 14, wherein:

the housing has at least two generally opposed housing sides; and wherein the each of said arms is pivotally connected to the each of said housing sides at said arm pivot.

16. The container holder of claim 15, wherein:

the door has at least two generally opposed door sides; and wherein the at least two generally opposed door sides are each pivotally connected to the at least two generally opposed housing sides at spaced-apart door pivots.

17. A container holder comprising:

a housing;

a door pivotally connected to the housing at a door pivot;

at least one arm pivotally connected to the housing at an arm pivot; and at least one linkage having a first end pivotally connected to the door at a linkage-door pivot and a second end pivotally connected to said arm at a linkage-arm pivot;

wherein the linkage-door pivot rotates about the door pivot and the linkage-arm pivot rotates about the arm pivot and the linkage-door pivot rotates about the door pivot in a direction opposite to the direction the linkage-arm pivot rotates about the arm pivot.

18. A container holder comprising: a housing;

a door pivotally connected to the housing using at least two spaced-apart door pivots;

at least two arms each pivotally connected at spaced apart positions to the housing at spaced-apart arm pivots; and at least two linkages each having a first end pivotally connected at spaced apart linkage-door pivots to the door and a second end pivotally connected to an arm at a linkage-arm pivot;

wherein the linkage-door pivots on each linkage rotates about a door pivot and the linkage-arm pivot on each arm rotate about an arm pivot and the linkage-door pivot on each linkage rotates about a door pivot in a direction opposite to the direction the linkage-arm pivot on said linkage rotates about an arm pivot.

* * * * *